US010506295B2

(12) United States Patent
Chen et al.

(10) Patent No.: US 10,506,295 B2
(45) Date of Patent: Dec. 10, 2019

(54) SYSTEMS AND METHODS FOR DELIVERING SECONDARY CONTENT TO VIEWERS

(71) Applicant: Disney Enterprises, Inc., Burbank, CA (US)

(72) Inventors: Alexander Chen, La Canada, CA (US); Leon Silverman, Encino, CA (US); Edward Drake, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/511,134

(22) Filed: Oct. 9, 2014

(65) Prior Publication Data
US 2016/0105707 A1    Apr. 14, 2016

(51) Int. Cl.
*H04N 21/233* (2011.01)
*H04N 21/488* (2011.01)
(Continued)

(52) U.S. Cl.
CPC ....... *H04N 21/4884* (2013.01); *H04N 21/233* (2013.01); *H04N 21/25875* (2013.01);
(Continued)

(58) Field of Classification Search
CPC .................................................. H04N 21/2424
(Continued)

(56) References Cited

U.S. PATENT DOCUMENTS

| 4,859,994 A | 8/1989 | Zola et al. |
| 6,263,505 B1 | 7/2001 | Walker et al. |

(Continued)

FOREIGN PATENT DOCUMENTS

| EP | 1185142 A2 | 3/2002 |
| WO | 2012114169 A1 | 8/2012 |

OTHER PUBLICATIONS

Mass Hysteria Entertainment Company, Inc.; Mass Hysteria Entertainment Company Signs Technology Deal with Software Developers Patrick Greene and Alexander Harrington for Its Interactive Cinema Experience, Computer Weekly News, Nov. 29, 2012, pp. 1-2, 85,NewsRx, Atlanta, United States.
(Continued)

*Primary Examiner* — Mushfikh I Alam
(74) *Attorney, Agent, or Firm* — Sheppard Mullin Richter & Hampton LLP

(57) ABSTRACT

Systems and methods disclosed herein include systems and methods for delivery of secondary content to a user device. The secondary content may comprise events synchronized to primary content. In a particular embodiment, the process may include: receiving a request from a user device to access secondary content associated with a primary content; determining whether the user device is entitled to receive the secondary content; and if the user device is entitled to receive the secondary content, providing the secondary content to the user device for the user device to play whenever the user watches the primary content. The secondary content comprises at least one of an audio track, and a subtitle file, and the audio track comprises at least one of an alternate language audio track not provided in the primary content, and an audio track with words omitted from the primary content.

19 Claims, 7 Drawing Sheets

(51) Int. Cl.
*H04N 21/4722* (2011.01)
*H04N 21/485* (2011.01)
*H04N 21/258* (2011.01)
*H04N 21/81* (2011.01)

(52) U.S. Cl.
CPC ... *H04N 21/25891* (2013.01); *H04N 21/4722* (2013.01); *H04N 21/4852* (2013.01); *H04N 21/4856* (2013.01); *H04N 21/8106* (2013.01)

(58) Field of Classification Search
USPC .................................................. 725/74–104
See application file for complete search history.

(56) References Cited

U.S. PATENT DOCUMENTS

| | | | |
|---|---|---|---|
| 6,785,539 B2 | 8/2004 | Hale et al. | |
| 7,277,870 B2* | 10/2007 | Mourad | G06F 17/3089 380/200 |
| 7,502,221 B2* | 3/2009 | Fuller | G06F 1/1616 361/679.04 |
| 7,938,727 B1 | 5/2011 | Konkle | |
| 8,079,044 B1* | 12/2011 | Craner | H04N 21/4532 725/28 |
| 8,179,475 B2 | 5/2012 | Sandrew | |
| 8,254,953 B2 | 8/2012 | Mcbride et al. | |
| 8,436,918 B2 | 5/2013 | Claydon et al. | |
| 8,814,692 B2 | 8/2014 | Konkle | |
| 2001/0005903 A1* | 6/2001 | Goldschmidt Iki | H04N 5/44543 725/50 |
| 2002/0054078 A1 | 5/2002 | Taniwaki et al. | |
| 2002/0101537 A1 | 8/2002 | Basson et al. | |
| 2004/0044532 A1 | 3/2004 | Karstens | |
| 2004/0139482 A1 | 7/2004 | Hale et al. | |
| 2005/0200810 A1 | 9/2005 | Morales | |
| 2005/0227614 A1 | 10/2005 | Hosking et al. | |
| 2006/0107195 A1 | 5/2006 | Ramaswamy et al. | |
| 2006/0136969 A1* | 6/2006 | Patton | A63J 25/00 725/78 |
| 2006/0143655 A1* | 6/2006 | Ellis | H04N 5/44543 725/47 |
| 2006/0184972 A1* | 8/2006 | Rafey | G06F 21/10 725/80 |
| 2006/0218226 A1 | 9/2006 | Johnson et al. | |
| 2007/0188657 A1 | 8/2007 | Basson et al. | |
| 2007/0216868 A1 | 9/2007 | Cashin et al. | |
| 2008/0155613 A1* | 6/2008 | Benya | H04N 7/17318 725/89 |
| 2009/0186700 A1 | 7/2009 | Konkle | |
| 2009/0298417 A1 | 12/2009 | Phillips | |
| 2010/0015994 A1 | 1/2010 | Mcbride et al. | |
| 2010/0125875 A1* | 5/2010 | Hays | H04N 7/17318 725/61 |
| 2010/0257569 A1* | 10/2010 | O'Hanlon | G11B 27/10 725/110 |
| 2011/0020774 A1* | 1/2011 | Nguyen | H04N 5/445 434/157 |
| 2011/0106970 A1* | 5/2011 | Song | H04L 65/4015 709/236 |
| 2011/0169930 A1* | 7/2011 | Bennett | G06F 3/14 348/59 |
| 2011/0184826 A1 | 7/2011 | Salamatov et al. | |
| 2011/0202156 A1 | 8/2011 | Glitsch et al. | |
| 2012/0064874 A1 | 3/2012 | Pierce, Jr. et al. | |
| 2012/0095749 A1 | 4/2012 | Capretta | |
| 2012/0210349 A1 | 8/2012 | Campana et al. | |
| 2012/0216222 A1* | 8/2012 | Candelore | H04N 21/4341 725/28 |
| 2012/0274850 A1* | 11/2012 | Hawkins | H04N 21/4307 348/515 |
| 2012/0290336 A1 | 11/2012 | Rosenblatt et al. | |
| 2012/0324505 A1* | 12/2012 | Casagrande | H04N 5/04 725/32 |
| 2013/0111514 A1 | 5/2013 | Slavin et al. | |
| 2013/0138781 A1 | 5/2013 | Landow et al. | |
| 2013/0205315 A1* | 8/2013 | Sinha | G06T 1/0021 725/14 |
| 2013/0272672 A1 | 10/2013 | Padro Rondon et al. | |
| 2013/0293777 A1 | 11/2013 | Huber et al. | |
| 2014/0028914 A1 | 1/2014 | Polak et al. | |
| 2014/0068687 A1* | 3/2014 | Greenberg | H04N 7/0884 725/93 |
| 2014/0089804 A1 | 3/2014 | Gazit et al. | |
| 2014/0108602 A1 | 4/2014 | Barnes et al. | |
| 2014/0123161 A1* | 5/2014 | van Coppenolle | H04L 65/4076 725/8 |
| 2014/0132481 A1* | 5/2014 | Bell | H05K 5/0017 345/1.3 |
| 2014/0143806 A1* | 5/2014 | Steinberg | H04N 21/23424 725/34 |
| 2014/0195653 A1 | 7/2014 | Alexander et al. | |
| 2014/0208351 A1* | 7/2014 | Moore | H04N 21/4856 725/35 |
| 2014/0259082 A1* | 9/2014 | Broome | H04L 67/32 725/86 |
| 2014/0282686 A1* | 9/2014 | Silverman | H04N 21/2407 725/31 |
| 2014/0282713 A1* | 9/2014 | Le Pelerin | H04N 21/4405 725/34 |
| 2014/0310754 A1* | 10/2014 | Collart | G06F 17/30056 725/74 |
| 2014/0373036 A1* | 12/2014 | Phillips | H04N 21/42203 725/12 |
| 2015/0003798 A1 | 1/2015 | Walker | |
| 2015/0012933 A1* | 1/2015 | Fay | H04N 21/23605 725/27 |
| 2015/0074735 A1* | 3/2015 | Herigstad | H04N 21/478 725/110 |
| 2015/0089530 A1* | 3/2015 | Abele | H04N 21/4884 725/25 |
| 2015/0095948 A1* | 4/2015 | Kummer | H04N 21/6143 725/35 |
| 2015/0143413 A1* | 5/2015 | Hall | G06Q 30/0271 725/34 |
| 2015/0143419 A1* | 5/2015 | Bhagwat | H04N 21/2265 725/37 |
| 2015/0163529 A1* | 6/2015 | Faarkash | H04N 21/234327 725/109 |
| 2015/0256903 A1* | 9/2015 | Walker | H04N 21/23614 725/32 |
| 2015/0363718 A1* | 12/2015 | Boss | G06Q 10/0633 705/7.27 |
| 2016/0323482 A1* | 11/2016 | Chung | H04N 5/9265 |

OTHER PUBLICATIONS

How MovieReading Works, How It Works, http://www.moviereading.com/en/support/, Dec. 9, 2013.
Ebert et al, U.S. Appl. No. 61/314,315, "Movie and Store Mode Mobile Device System and Method", filed Mar. 16, 2010, pp. 1-17.

* cited by examiner

SYSTEMS AND METHODS FOR DELIVERING SECONDARY CONTENT TO VIEWERS

TECHNICAL FIELD

The present disclosure relates generally to audio and video content, and, more particularly, to systems and methods for delivering secondary content to viewers.

DESCRIPTION OF THE RELATED ART

The movie-watching experience has evolved over time. There have been vast improvements in animation, 3D and special effects, as well as improvements in the ways users are able to access audio-visual content, including improvements to mobile devices and effective high-definition streaming services, among others. However, further advances can be made to take advantage of new technologies to individualize the user viewing experience and provide value-added services.

BRIEF SUMMARY OF THE DISCLOSURE

According to various embodiments, systems and methods described herein provide users with secondary or supplemental content (such as an alternate audio track in a user-selected language and/or without certain words designated by the user) to accompany primary program content.

For example, the present disclosure may be embodied in a method comprising: receiving a request from a user device to access secondary content associated with a primary content, wherein the secondary content comprises at least one of a subtitle file and an audio track, the audio track comprising at least one of an alternate language audio track not provided in the primary content, and an audio track with words omitted from the primary content; determining whether the user device is entitled to receive the secondary content; and if the user device is entitled to receive the secondary content, providing the secondary content to the user device for the user device to play whenever the user watches the primary content. The subtitle file may comprise visual subtitles that can be displayed on the user device when the user is watching the primary content.

The method may further comprise receiving a sample of the primary content; identifying the primary content; and accessing secondary content associated with the identified primary content. In another aspect, the method may further comprise providing a menu on the user device to request the secondary content, wherein the secondary content comprises a plurality of alternate language audio tracks associated with the primary content.

In a more particular aspect, providing the secondary content to the user device for the user device to play whenever the user watches the primary content may comprise synchronizing playback of the secondary content with the primary content.

In one aspect, the method may further comprise receiving a language preference from the user device, and identifying secondary content that is related to the primary content according to the received language preference.

In a further aspect, the method may further comprise receiving user account information from the user device; and storing a language preference as a user preference associated with the user account information. The method may further comprise identifying a user using user-specific credentials, and automatically retrieving the language preference after identifying the user.

In another aspect, the method may further comprise: if the user is not entitled to receive the secondary content, sending a graphical user interface to the user device to allow the user to purchase a license to access the secondary content. The purchase may allow the user to access the secondary content a finite number of times and/or a finite period of time, or, alternatively, the purchase may allow the user to execute the secondary content an unlimited number of times.

In a particular embodiment, the primary content may comprise a plurality of versions, and purchase of secondary content may permit the user device to access secondary content relating to each of the plurality of versions of the primary content. In this embodiment, the method may further comprise identifying a particular version of the primary content from the plurality of versions of the primary content. The secondary content may be identified according to the particular version of the primary content, and/or the execution of the secondary content may be modified according to the particular version of the primary content.

In another embodiment, the present disclosure may also be embodied in a method comprising receiving purchase information for a user to purchase a license to access secondary content related to a primary content that has not been publicly released yet, the secondary content comprising at least one of an audio track and a subtitle file; storing pre-purchased secondary content information on a user account server indicating that the user has pre-purchased the secondary content; and providing the secondary content to a user device for the user device to play with the primary content once the primary content has been publicly released.

Providing the secondary content to the user device may comprise synchronizing playback of the secondary content with the primary content.

The method may further comprise identifying the user using user-specific credentials, the pre-purchased secondary content information being associated with the identified user. The language preference may be stored as a user preference associated with the identified user.

The method may further comprise providing an advertisement for the primary content in accordance with the language preference.

The present disclosure may also be embodied in a non-transitory computer readable medium or a system comprising an application server comprising a non-transitory computer readable medium that comprises an instruction set configured to cause a computing device to perform the steps of the processes described herein.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

Figure 1:
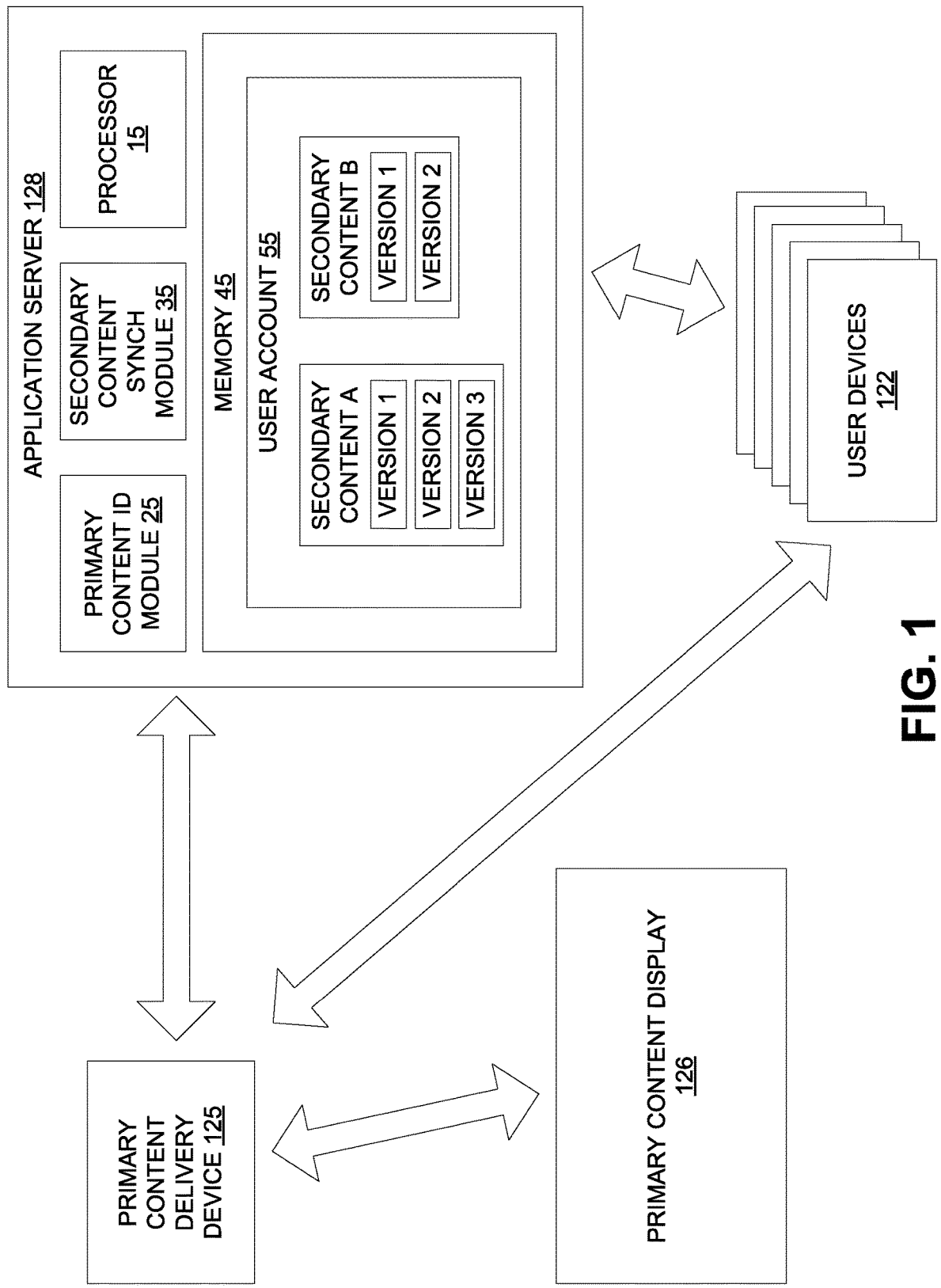
FIG. 1 illustrates a system for providing secondary content in accordance with one embodiment of the present disclosure.

The systems and methods described herein provide secondary content to one or more user devices to accompany primary program content seen on another device or the same user device(s). For example, the secondary content may be visual subtitles or an alternate audio track in a user-selected language and/or omitting certain words designated by a user (i.e., pre-blocked by the user), such as swear words or words that refer to race, ethnicity, color, religion, sex, sexual orientation, cultural status, etc.

In one aspect, a user uses a device to send a request to a server to access (e.g., purchase or subscribe to a service for) an audio track (e.g., specific language and/or with certain words blocked) and/or visual subtitles for a specific movie. The audio track and subtitles may be stored in a media server or database (digital locker). If certain conditions are met (e.g., the server receives payment from the user), the server provides the user with an entitlement to access that audio track and its various versions (e.g., for different TV channels) and/or subtitles. The entitlement may be a license, an authorization or a link between a user account and the audio track and/or subtitles. The user can then access that audio track and/or subtitles on any compatible device via a download or stream whenever the user watches the movie in any location (any theater or on any TV channel). The number of times the user can access the audio track and/or subtitles may be unlimited, limited to a set number, or limited to a period of time.

In one aspect, the server can use one or more ways (e.g., audio recognition, image recognition, TV channel identification, location identification) to determine which version of the movie (standard version at a movie theater, sped up or slowed down version on a TV channel (e.g., ABC, TNT, TBS, FX), airplane edited version, with inserted commercials, no commercials, etc.) is being watched by the user in a theater, on a TV, or other device. Then the server can either 1) retrieve the proper modified version of the audio track to stream or download to the user device; or 2) dynamically modify the audio track for that version of the movie to stream or download to the user device.

For example, a user may purchase an alternate language audio track on the user's device to stream or download and play while the user watches a movie at a theater. Later, when the movie is released on DVD, Blu-Ray, online video streaming/downloading service, and/or TV channels, the user can stream or download and play the alternate language audio track (original version or a modified version) while the user watches the movie on DVD, Blu-Ray, or a TV channel.

The systems and methods described herein allow for greater individualization and enhancement of the movie watching experience. By providing secondary content that is tailored to individual users, the described systems and methods provide an incentive for previously unreached consumers to watch movies. For example, alternate language audio tracks and/or subtitles allow viewers to enjoy watching movies in their native languages, which they previously may not fully enjoy. Additionally, the educational benefits of watching a movie in a non-English language with English subtitles may encourage educators to take non-English language students to movies to learn a non-English language.

The systems and methods described herein can be applied to the in-theater experience, or in a home, such as a user watching a movie on a Blu-Ray or DVD player or a TV channel, or downloading and/or streaming video onto a personal computing device.

After a user selects a specific audio track for a movie, the server may offer products or services for the user to purchase that are related to the movie and the user-selected audio track. Related products and services may include home release media such as DVD or Blu-Ray discs, CDs, merchandise and toys, associated theme park or event tickets, restaurant dining and more. Presentation of advertisements at the time of the movie allows for the producers of the related products and services to capitalize on the positive memories and emotions that occur during or immediately after a movie. By presenting these products at the same time as the movie, users will be presented with the opportunity to purchase these products at the height of their positive feelings towards the movie.

Advertisements may also be more effective because they may be tailored to the user-selected audio track. For example, if the user has selected a preferred language, advertisements may be presented in the preferred language, and DVDs and Blu-Rays in the preferred language may be offered. Similarly, by offering related products and/or content before a movie is viewed or even released, producers may capitalize on anticipation and build-up leading up to a movie release such that users are further encouraged to watch a particular movie because they have already pre-ordered merchandise or content (e.g., an alternative audio track) for it.

FIG. 1 illustrates a system for providing secondary content (audio track or subtitles) in accordance with one embodiment of the systems and methods described herein. The system in FIG. 1 includes an application server 128, a primary content delivery device 125, a primary content display device 126, and one or more user devices 122. As depicted by the arrows in the illustrations, the application server 128, the primary content delivery device 125, the primary content display device 126, and the user devices 122 may be in communicative contact with one or more other components in this example.

The primary content delivery device 125 can be configured to provide or play audio/video content to one or more users or viewers. Primary content display device 126 displays the video content to the users. In some embodiments, primary content display device 126 is integrated with primary content delivery device 125, while in other embodiments, they are separate devices. For example, in terms of the in-theater environment, the primary content delivery device 125 can include a motion picture projection system. Such a motion picture projection system can be configured to project a motion picture onto a movie screen and to provide the soundtrack or other audio content accompanying the movie. Accordingly, the primary content display device 126 can include a movie screen onto which the motion picture is projected by primary content delivery device 125.

In an alternative embodiment, the primary content delivery device 125 may be a computing device that is configured to play audio/video content, and the primary content display device 126 may be a display that is attached to and/or a part of the computing device. Examples may include televisions with set top boxes, displays in a plane, airport, bus, train, or other place, tablet computers, smart phones, or laptops that are configured to play audio/video content, and have a built-in display to display the content.

User devices 122 can be fixed (e.g., fixed to seats in a theater) or portable devices. User devices 122 can include, for example, a plurality of client or user devices such as iPads®, tablet computers, iPhones®, Kindles®, Android® devices, or other tablets, mobile phones or computing devices. User devices 122 have a sufficiently large display area to allow suitable viewing of secondary content or to allow sufficient touch-screen area for viewing and selection of secondary content options (described in greater detail below).

In some embodiments, an application program may be downloaded onto the user device 122 (FIG. 3 described further below) to receive inputs from a user and to provide secondary content to a user. The application provides secondary content that at least in part corresponds to, or is designed to accompany, the primary content. Various embodiments provide methods to initiate the application and synchronize the application with the primary program content. Accordingly, the application can provide secondary program content, synchronized or otherwise, to accompany the primary program content.

In one configuration, the user devices 122 may not contain a display and may be configured to provide only non-visual secondary content. For example, if only audio secondary content is provided, then the audio secondary content can be played on an MP3 player or other audio player without a display. As such, it should be understood that although this disclosure generally deals with user devices with displays, displays are not a requirement to fall within the meaning of a user device as contemplated by this disclosure.

In one embodiment, the application server 128 may comprise a primary content identification module 25, a secondary content synchronization module 35, a processor 15, and a memory 45, as shown in FIG. 1. The primary content ID module 25 is configured to identify primary content so that secondary content related to the primary content may be provided. The secondary content synchronization module 35 is configured to synchronize secondary content with the related primary content. User account information, such as user account 55, is stored in the memory 45. The user account information may include secondary content entitlement information. In the example shown in FIG. 1, user account 55 contains entitlement information for secondary content A and secondary content B. These two pieces of secondary content each comprise multiple versions of the secondary content (versions 1, 2, 3, etc.) to be used with various versions of the related primary content. These components and their functions will be discussed in greater detail below.

The application server 128 can include a computing system with wired or wireless communication interfaces to communicate with one or more of: the primary content delivery device 125, the primary content display device 126, and the user devices 122. The application server 128 can be implemented, for example, as a computing system using the Windows®, Apple®, Unix®, Linux®, MacOS, or other operating system. In various embodiments, communications with the user devices 122 are all wireless communications so that the users can enjoy an untethered experience. In one example, the application server 128 can be a server local to primary content delivery device 125, e.g., a movie theater, and communicating with the user devices 122 via a wireless access point in the theater vicinity. In another example, the application server 128 can be a server that is not local to the primary content delivery device 125 and that communicates with the user devices 122 via cellular networks, via an IP network and a wireless access point, other wide area networks, or via another communication interface. In yet another example, the application server 128 can be implemented using a combination of both local and remote components.

Communication links are illustrated in the example system of FIG. 1. Such links are provided between the primary content delivery device 125, the application server 128 and the user devices 122. Other communication configurations are possible without departing from the scope of the application. For example, in some embodiments, the program content running on the primary content delivery device 125 can be pre-configured and does not require real-time interaction via a network or other communication link. That is, the program content can be played without change or interruption to the program. Accordingly, in such embodiments, a communication interface is not required between the primary content delivery device 125 and the application server 128 or the user devices 122. Instead, the primary and secondary program content can be synchronized and set to run independently.

In one embodiment, the systems and methods described herein can be provided and applied to enhance and individualize the movie-watching experience. For example, primary program content can be provided by the primary content delivery device 125 in the form of a motion picture such as a full-length feature movie. Other types of video or audio/video content can also serve as the primary content. In this example environment, the primary program content is presented to the audience members (sometimes referred to in this example as viewers or users) on the primary content display 126, such as the conventional movie screen at the front of the theater. The application loaded onto the user devices 122 can be configured to provide secondary content to the audience members; the secondary content accompanying, and in some cases corresponding to, the motion picture being displayed on the primary content display 126.

Continuing with this example, the client application executing on the user devices 122 is synchronized to the motion picture on the primary content display 126 such that secondary content can be synchronized with, and in some embodiments triggered by, events in the motion picture. For example, the movie can have visual and/or audio cues (to be detected by image recognition and/or audio recognition software at the user device 122) or be tagged with semaphores, flags or other data to trigger certain aspects or subroutines of the application. If an audio signal is used, the audio signal may be audible (e.g., opening theme song) or not audible to humans (e.g., very low or very high frequency). If data-drive cues are used, such data might include time codes that are embedded in the primary video content and in the secondary content and can be used to synchronize the secondary content to the primary content. The secondary content's time code data can be periodically or constantly matched to time data in the primary video content to ensure that they are in sync with each other. Pre-defined location markers, such as chapter markers, may also be used to synchronize the content. This can be correlated, in various embodiments, through the application server 128 that receives the tags from the movie content of the primary content delivery device 125 and signals the user devices 122 to execute the corresponding subroutine in the client application. Alternatively, a synchronization signal may be manually entered to the user device 122 by the user to synchronize the secondary content to the primary content, or the application executing on the user device 122 may take input data about the primary content to synchronize the secondary content.

In further embodiments, other synchronization techniques can be used, such as, for example, audio synchronization, synchronized start with elapsed time measurement, or other synchronization techniques. In one example, multiple synchronization techniques may be utilized to ensure more accurate synchronization. Accordingly, the system can be configured such that a particular event in the movie can trigger a corresponding activity or event on the user devices. Alternatively, the system can be configured such that the application server 128 or other computing device controls the primary content and the client applications to maintain synchronization. It should be understood from this disclosure that numerous methods may be used to synchronize the primary content to the secondary content, and such methods may be carried out by any of the primary content delivery device 125, the application server 128, and/or the user devices 122.

Secondary content may include any content that may accompany and/or relate to the primary content, including, but not limited to, alternative language tracks; visual subtitles; trivia or quiz contests based on events in the movie, possibly in multiple languages; polls requesting that the audience members vote for favorite characters, possibly in multiple languages; optional endings or other scenes; and other content, events, and activities to involve viewers in the movie.

In further embodiments, executing secondary content may comprise using the user device 122 as a duplication and/or an extension of the primary content display 126. For example, audio and video content can be provided on the user devices 122 to allow the user devices 122 to serve as secondary viewing and/or listening platforms which duplicate and/or provide additional content associated with the primary content. A more specific example might entail providing alternative language tracks or subtitles on the user device 122 for viewers who speak other languages.

Figure 2:
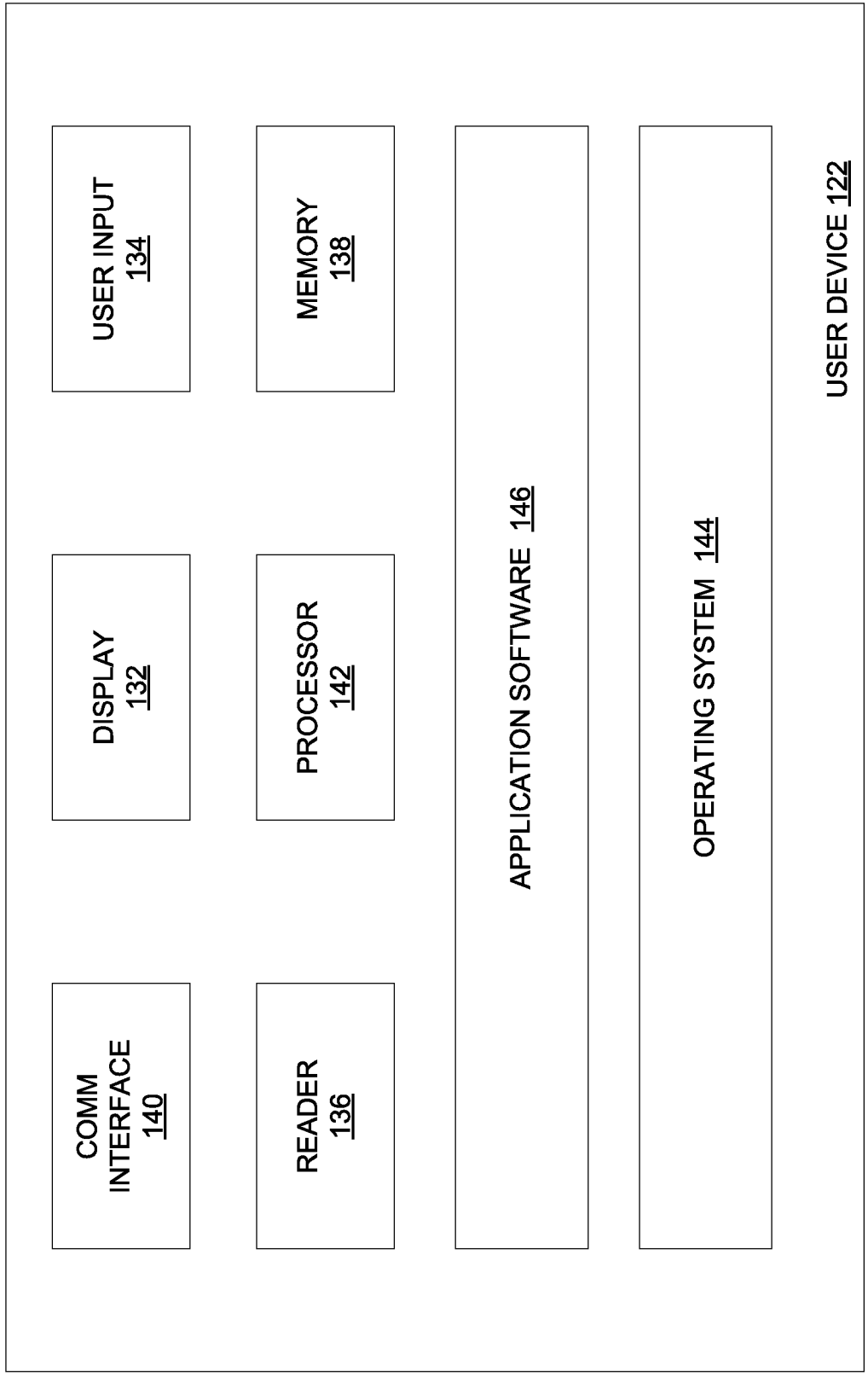
FIG. 2 illustrates an exemplary user device in accordance with one embodiment of the present disclosure.

FIG. 2 illustrates one example of a user device 122 of FIG. 1. The user device 122 may include operating system software 144, which may be a conventional operating system such as Windows, MacOS, Linux, or others; or may be a stripped down version of an operating environment such as a Java Virtual Machine or the like; or it may be a mobile operating system such as the Android Operating System from Google, the iOS from Apple, the Windows Phone from Microsoft or other mobile operating system. The operating system software 144 may include software routines that allow for the hosting and execution of one or more application programs such as application software 146.

The application software 146 may include software that provides additional functionality to the user device 122. In some embodiments, the application software 146 may include applications to provide and execute secondary content such as those described herein. As described herein, application software 146 may be downloaded to the device 122 via communication interface 140 (described below) or it may be preinstalled in memory of user device 122.

As shown, the example user device 122 includes a display 132. The display 132 may form part of the user device 122, or it may be a separate hardware component that is connected to the user device 122. For example, the display 132 may be a touch screen display, which is part of the iPad device, or may be a monitor attached to a desktop computer.

The example user device 122 also includes a processor 142 and memory 138. The memory 138 may include volatile memory such as a random access memory, and it may include non-volatile memory such as flash memory or a hard disk drive. The processor 142 may be a conventional central processing unit (CPU) such as those manufactured by AMD and Intel, or it may be a specialized processor. The processor 142 may be configured to execute computer instructions from the operating system software 144, application software 146, or other software stored in the memory 204.

The user device 122 may also include a communication interface 140. The communication interface 140 may take the form of a network interface chip or card and its corresponding driver software that allows the user device 122 to communicate with external networks. For example, communication interface 140 can include communication interfaces to support communication protocols such as 2G, 3G, or 4G LTE cellular, Bluetooth®, WiFi®, near field communication (NFC), USB, Cat5, or other wireless or wired protocols. The user device 122 may further include a card reader or other memory device reader 136 capable of reading removable memory cards such as, for example, SD cards, miniSD cards, Compact Flash cards, USB flash drives and the like.

In one embodiment, the user devices 122 may have certain functions locked or partially disabled when the user devices 122 detect that a movie is being played. Examples of functions that can be locked or partially disabled are the camera (to prevent users from capturing images or recording video of the movie) and the cellular transceiver (to prevent users from making or receiving calls or texts during the movie). It may be desirable, in certain embodiments, for the actual hardware components or the user device 122 to remain active so that they are accessible to the application software 146, but are not accessible by the user or other applications. For example, the camera and/or microphone may need to be used by the application software 146 to perform synchronization, but the user functions of recording audio or video may be disabled to prevent piracy. Similarly, the cellular transceiver may remain active so that the user device 122 is able to maintain any necessary connections, e.g., to the application server 128 or the primary content delivery device 125, but the user functions of calling or sending/receiving text messages may be disabled. Alternatively, the connection to the application server 128 or the primary content delivery device 125 may be carried out by a communications medium other than cellular communications (e.g., wireless internet or Bluetooth or NFC). In this way, the cellular transceiver may be completely deactivated, while still maintaining any necessary connections between the user device 122 and the application 128 and/or the primary content delivery device 125. The speaker on the user device 122 may also be locked or partially disabled to prevent disruptive noises from the user devices 122. In some cases, a user can listen to audio from the user device 122 through headphones, wherein the user device 122 mutes itself when headphones are not plugged into the user device 122.

Figure 3:
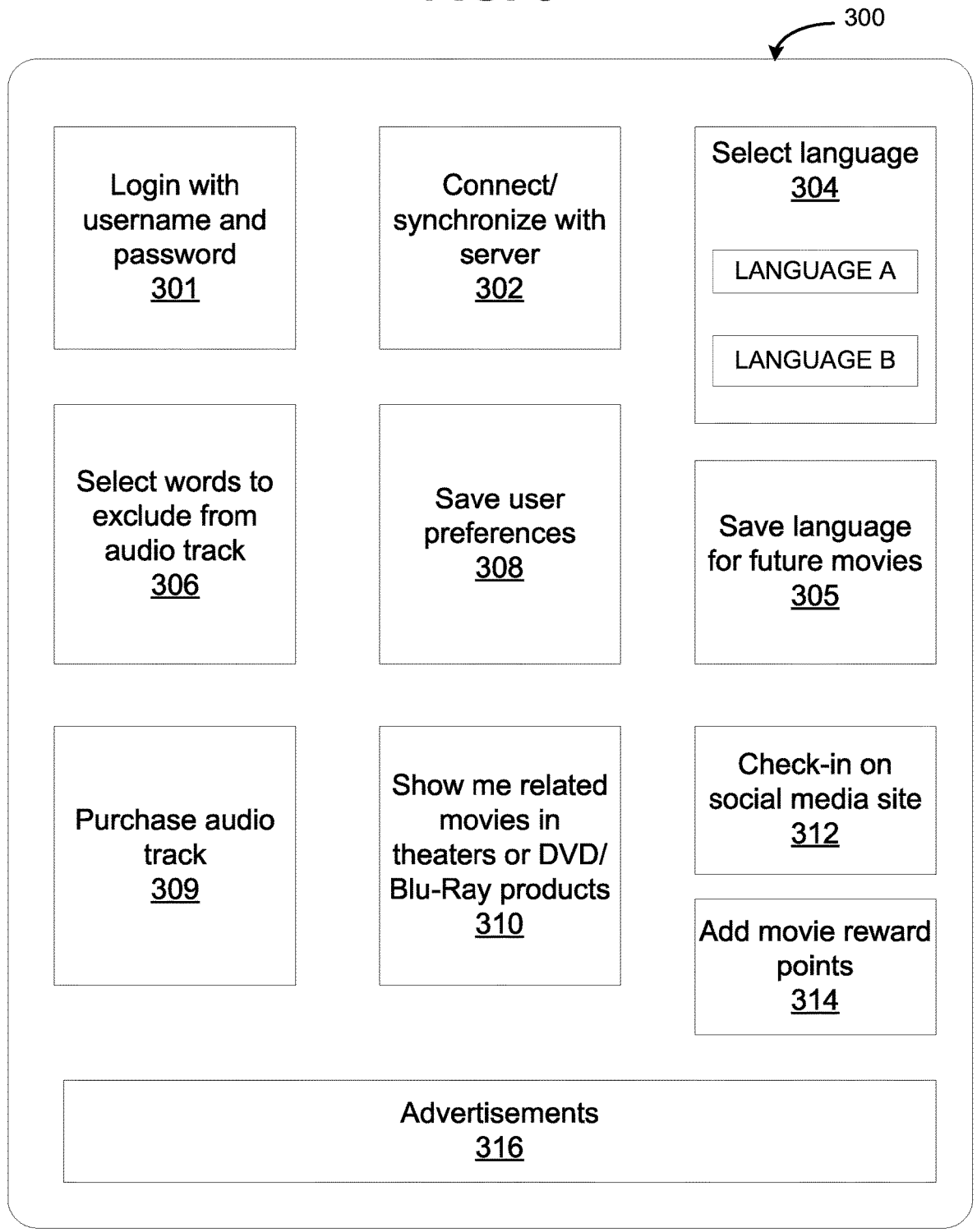
FIG. 3 illustrates an example user interface that may be displayed on the user device of FIG. 2.

FIG. 3 illustrates an example user interface 300 that may be displayed on the user device of FIG. 2. The different functions and aspects of the user interface 300 will now be described in greater detail with reference to exemplary processes for providing secondary content to one or more user devices.

Figure 4:
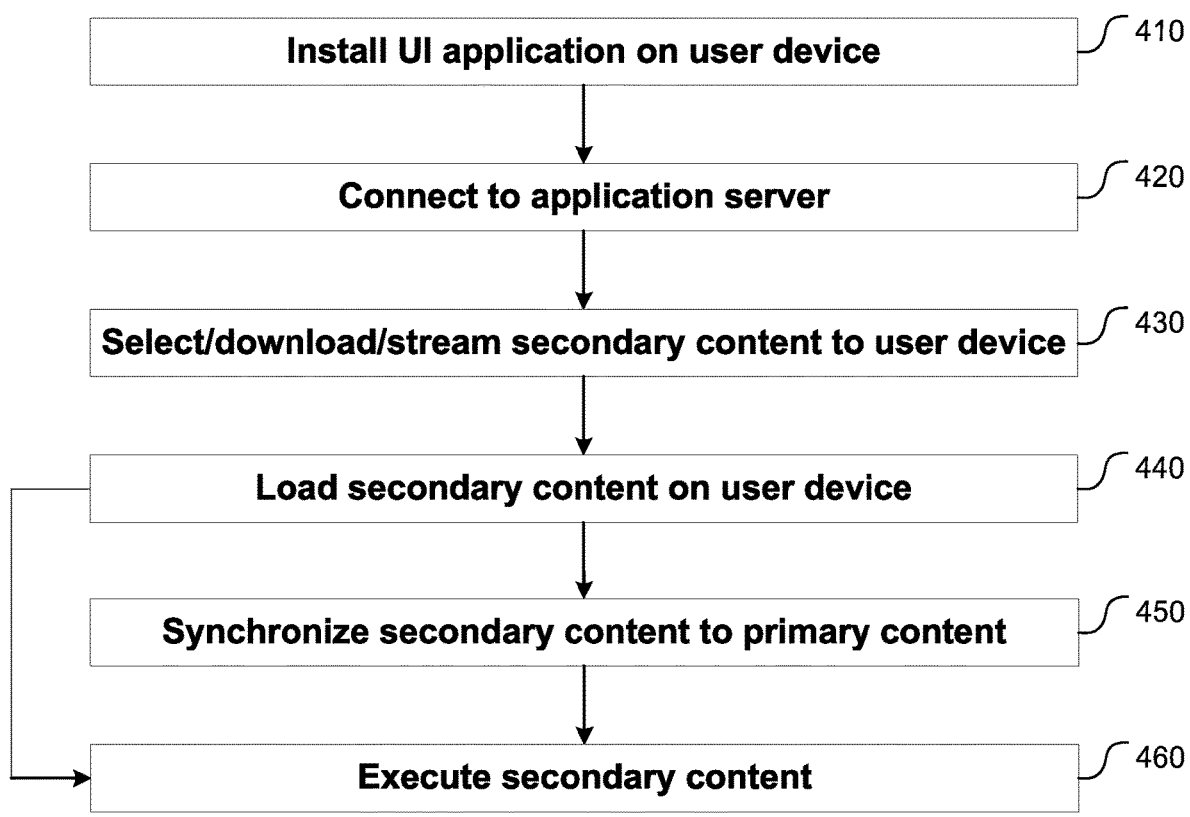
FIG. 4 illustrates an example process for providing secondary content to one or more user devices in FIG. 1 in accordance with one embodiment of the present disclosure.

FIG. 4 illustrates an example process for providing secondary content to one or more user devices in accordance with one embodiment of the systems and methods described herein. In FIG. 4, at operation 410, a user-interface application, such as the user-interface 300 shown in FIG. 3, is installed on the user device. This user-interface application, in some embodiments, is the application software 146 of FIG. 2. In one embodiment, the user-interface application is an application on a mobile device or a similar application on another computing device. This application is used to interact with the application server 128 to receive and execute secondary content on the user device. By way of example, in terms of the in-theater experience, the viewer may attend the designated movie in the designated theater. While the primary content is projected on to the theater screen, secondary content may be executed on user devices such as smart phones or tablets at the user's seat. The viewer may bring his or her iPad or other user device to the theater, or user devices may be provided at the theater to the viewers.

At operation 420, the user device connects to an application server (e.g., by pressing a tab or icon 302 in FIG. 3). This connection can be established using a wired or wireless connection, such as, for example, an IEEE 802.11 Wi-Fi network connection, a cellular (e.g., 3G or 4G) connection, a Bluetooth connection, near field communication, or other communication connection. In certain embodiments, the system can be configured to connect to the user device before the user enters the theater or screening room. For example, the system can be configured to connect the user device to the application server while the user is in line for tickets or admission, or in the lobby or the snack shop. In another embodiment, the system may allow for connection to the application server anywhere that the user has an internet or wide area connection, thereby allowing the user to view, select, purchase and download secondary content before they head to the movie theater or other screening venue (blocks 304-309 in FIG. 3).

In one embodiment, the user connects to the application server by opening the user-interface application on the user device, and then logging in using a password or other key (block 301 in FIG. 3). In this embodiment, a user may be required to register for a unique username and password that is associated with that user. In a further aspect, the user may have a movie reward account with a theater or movie studio. Registration and association of a username and password with a particular user may allow for greater personalization of the user's movie experience. For example, when a user logs in using their username and password, the user-interface application might manually (block 312 in FIG. 3) or automatically "check-in" the user as an attendee and/or viewer of the movie in a social media web or mobile site. This might increase a user's social media presence, while simultaneously providing publicity for the movie.

Additionally, the user may be able to store or save preferences that are associated with their account, such as a language preference (blocks 305 and 308 in FIG. 3). When a language preference is set, the application might automatically offer an alternative language track in the user's preferred language any time a user logs in at a movie (block 304 in FIG. 3). Additionally, product advertisements that are specifically tuned to the user's preferences may be offered to the user (blocks 310 and 316 in FIG. 3). For example, if the user sets a preferred language, product advertisements might appear on the user's application in the user's preferred language, or movie trailers may be played in the user's preferred language. Advertisements (block 316 in FIG. 3) may also be tuned to the specific user by offering the user products that are similar to past products that the user has purchased. Users may also be offered rewards on their personal accounts for attending and/or viewing movies (block 314 in FIG. 3) and logging in or checking into social media at a movie or purchasing products through the user-interface application (block 310 in FIG. 3). These rewards could be redeemed for prizes or benefits, which would incentivize users to attend more movies, log in, and use the user-interface application.

User registration and log-in also provide a security feature by allowing certain purchased or earned products to be used only by that particular user on one or more devices. For example, if a user purchases secondary content, such as an alternative audio track for a movie, then that secondary content will be associated with that particular user and can only be accessed by logging into that user's account on one or more devices. In one embodiment, this may be carried out by "watermarking" the audio track with user-identifying information so that the track is tied to that particular user. In another embodiment, secondary content purchased by a user may be stored in a remote server, possibly the application server, such that any secondary content purchased by a user is accessible to the user any time they can connect to the remote server. Alternatively, or additionally, purchased secondary content may also be stored locally on a user's user device. In this embodiment, it is possible that secondary content purchased by a user can only be played on user devices that are associated with the particular user.

At operation 430, the secondary content associated with the primary content is selected, downloaded and/or streamed from application server to the user device. In the movie-theater context, the secondary content can be downloaded in advance of the viewer going to the theater or, alternatively, it may be downloaded onto the user device when the user enters the theater. The secondary content may also be downloaded piecemeal such that it is "streamed" (with or without storing a digital copy) to the user device as the primary content is playing. Similarly, in the home-theater/Blu-Ray/DVD context, a user may download and/or stream the secondary content just before or during playback of the video content, or may download the secondary content well in advance. For example, the user may receive the secondary content at a local store using NFC or Bluetooth, possibly at the same time that they purchase the primary video content (e.g., receiving and/or purchasing secondary content at the time the user purchases a Blu-ray disc).

In some embodiments, the secondary content may download automatically upon connection to application server. For example, product advertisements could download and display automatically on the user device, thereby offering the user products that are related to the movie or other movies by the same production company. In other embodiments, the viewer initiates the download using one or more tabs, icons or buttons via the user interface, as shown in FIG. 3. For example, upon connection to the application server, a username and password or other key may be required to allow the user to access the network (block 301 in FIG. 3). Then the user can select the appropriate secondary content, and download the selected content. The viewer may be asked to select the appropriate title, application, or other identifier for the movie that he or she is viewing. Alternatively, the user device may interact with the application server and/or the primary content delivery device to automatically identify a movie being played, determine relevant secondary content, and then provide this content to the user to select for download or stream.

Once secondary content has been streamed or downloaded to the user device, the user device loads the secondary content at operation 440. Loading of the secondary content allows for the user device to determine whether the secondary content can be executed immediately, or should be executed later. For example, advertisements or pre-movie trivia facts or questions might be displayed immediately. In these embodiments, the method skips directly to operation 460 and executes the secondary content. Alternatively, other types of secondary content, such as alternate language audio tracks, alternate language subtitles, or scene-specific trivia or advertisements, or any other time-sensitive secondary content may need to be synchronized to the primary program content before being executed. In these embodiments, the method moves to operation 450.

At operation 450, the secondary content loaded on the user devices is synchronized to the primary program content. In one embodiment, a synchronization signal or signals can be provided by the application server to the user devices and primary content delivery device to synchronize them. In other embodiments, any one of these devices can be configured to synchronize with the others using communications over the network. Examples might include synchronization through WiFi, Bluetooth, near field communications, or any other wired or wireless communications mean by which synchronization signals may be transmitted. In still other embodiments, audio synchronization or visual synchronization can be used. For example, in one embodiment, Smart Sync Media Synchronization software, available from Audible Magic Corporation in Los Gatos, Calif., may be used to synchronize the secondary content on the user devices to the primary program content being played by primary content delivery device.

At operation 460, the secondary content is executed or played. As stated previously, execution of secondary content may be independent of the primary content, or it may be synchronized with the primary content. Because in some embodiments the devices are synchronized, the secondary content can be timed or triggered to occur in conjunction with related or relevant happenings in the primary content. For example, the receipt of a particular trigger signal on a user device can be used to initiate predetermined secondary content associated with that trigger. In some embodiments the trigger signals can be unique signals, each associated with a particular event. In other embodiments, the trigger signals can be the same or similar, and the events programmed to initiate in sequence upon the receipt of each trigger signal.

In other embodiments, the event initiated on the user devices may be content that is not necessarily triggered by a particular event in the movie. For example, the event can be a user-initiated event that is made available by the application, but that does not necessarily correspond to a particular scene or event in the movie. Such events may be themed like the movie, but may be initiated automatically or initiated on viewer demand.

As described above, the event initiated on user devices can be based on an application that was downloaded to the user devices when the user logged onto the network in the theater, or in advance of the showing. In other embodiments, the event can be content that is streamed to the user devices in real time over the in-theater network, via the Internet, or from some other external source.

In one embodiment, a server and a plurality of user devices can synchronize multiple audio tracks together with others in a "sharing group" such that if one user had relatives in a different location, i.e., country, as long as there were entitlements in place, that user could simultaneously watch a film in a shared (or different) language and communicate through their user devices or yet another secondary device, such as a device with a screen.

In one configuration, the user device 122 and/or a headset can use noise or audio signal cancellation software and hardware to cancel or filter out the primary audio track used in the movie. Since every spoken word in the movie is known, sound data can be provided to cancel or filter out every word spoken in the main language of the movie. For example, if the movie in shown in English, the user device can apply noise or audio signal cancellation software to cancel or filter out the English spoken words, such that the user only hears his/her selected language audio track (e.g., Spanish or Chinese) and the background sound effects in the movie.

In one configuration, the user device may include or be combined with glasses that show subtitles in the user-selected language.

A movie theater can show a movie in a default language, but any number of other languages can be played by user devices to watch the same movie. There may be very little or no extra cost to theaters.

Figure 5:
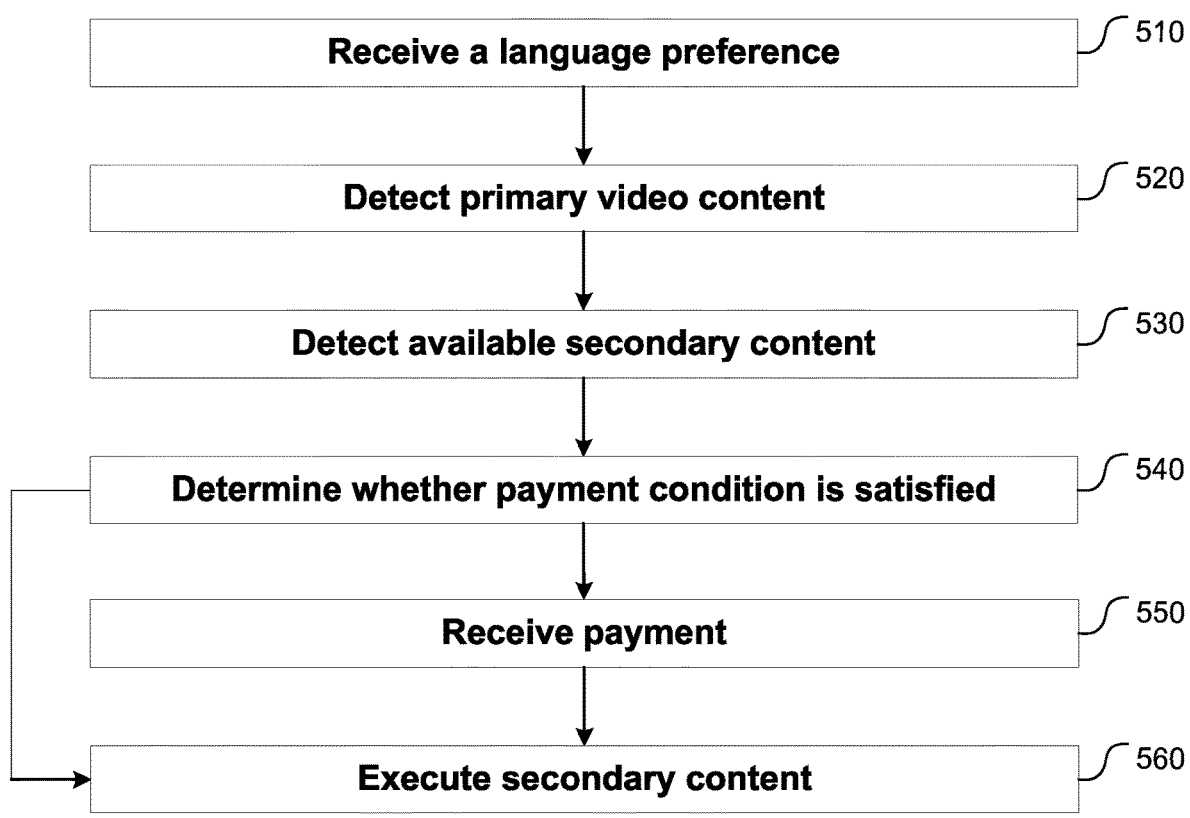
FIG. 5 illustrates an example secondary content sale process, in accordance with an embodiment of the present disclosure.

FIG. 5 illustrates a secondary content sale process, in accordance with another embodiment of the present disclosure. At operation 510, the user selects, and the user device receives, a language audio track and/or subtitle preference. It should be understood that the language audio track and/or subtitle preference may be a language preference, or it may omit or block certain topics and/or words, such as a selected language maturity preference (e.g., different MPAA ratings).

At operation 520, primary video content is detected. The primary video content may be played at a theater, or at a user's home, or on a user's personal computing device, or any other possible venue. The audio track/subtitle preference of operation 510 may be pre-selected, such that a pre-selected language preference is applied to all video content. Alternatively, the language preference of operation 510 may be selected after video content is detected in operation 520, such that the user can select a language preference for a particular viewing. At operation 530, available secondary content is found based on the selected language preference and the detected primary video content. For example, an application running on a user device may communicate with a server to perform a search for a foreign language audio track for the primary video content based on the selected language preference.

At operation 540, a determination is made as to whether a payment condition or subscription has been satisfied for the available secondary content. This may be carried out by the user device, the primary content delivery device, and/or the application server, either individually or in concert. For example, a user may choose to purchase a foreign language audio track for a film. The user may be given the option to purchase the track just for the current viewing, i.e., a one-time purchase. This may be considered a "rental" arrangement, where the user is entitled to only a certain number of uses of the secondary content and/or entitled to use the secondary content for a certain period of time. Alternatively, the user may be given the option to permanently purchase the secondary content such that they are able to access and use the secondary content repeatedly on any device at any location. Using the example of the foreign audio track, if the user purchases such a track, the user may be entitled to use the foreign audio track every time they re-watch that particular film, whether it is at a theater or in their home, etc. If the payment condition has been satisfied, then the process moves to operation 560, and the secondary content is streamed or downloaded and executed. If the payment condition has not been satisfied, the process waits until the payment condition is satisfied (operation 550) before executing the secondary content.

In a particular embodiment, purchasing and/or renting the secondary content may grant access to multiple versions of the selected secondary content. For example, a user may choose to purchase and/or rent a particular audio track for a film. However, certain television studios may alter films for their broadcast, possibly to adhere to certain time constraints or to remove content not suitable for television broadcast. The changes made to the television broadcast may include deletion of scenes, or speeding up or slowing down of certain scenes. Many films may have thirty or forty different versions for different television broadcasts. As such, if a user purchases and/or rents a particular language track for a particular film, the user may be granted access to different or modified versions of the language track so that the user can watch all of the different versions of the same film in their preferred language.

In this particular embodiment, the step of detecting video content (e.g., block 520 in FIG. 5) may comprise detecting the specific version of the video content. Detection of the specific version may occur continuously and/or periodically. One possible method by which this may be performed is by using the audio/visual cues discussed above with regard to synchronization of secondary content to primary content. For example, a microphone on a user device may pick up audio cues to synchronize the secondary content to the primary content. Unique audio cues may be used to identify a unique version of a particular film.

Alternatively, any changes that were made to the primary content for the television broadcast can be determined in real-time by tracking the broadcast and synchronizing periodically or continuously. Detection of the correct version of the primary content may also be performed using metadata. If the user device playing the secondary content is able to receive metadata about the primary content, then the metadata may indicate any revisions that have been made to the original content such that the user device or media server can make corresponding changes to the secondary content (e.g., if a scene has been slowed down by 5%, the user device or media server can slow down the audio track by 5%, or if a scene has been skipped, the audio track can skip to a particular time code).

In another embodiment, each version of the primary content may have a unique identifier that is then used to determine the correct version of the secondary content that should be used (or the correct modifications to be made to the secondary content to match with the primary content). The unique identifier may be provided by the user (e.g., user may input an actual ID code, or the user may select a particular broadcast network and air time which can be used to identify the version of the film being played). Alternatively, the unique identifier may be automatically detected using other input means on the user device, such as wireless or wired communications (e.g., Bluetooth, NFC), audio inputs (e.g., audio sync and/or use of ultrasonic frequencies to determine correct version), visual inputs (e.g., QR code or visual sync), or other input means as have been previously described.

Further, if the user purchases secondary content, he or she may be permitted to use the secondary content in a variety of different environments in different ways, depending on the environment. For example, if a user purchases secondary content while watching a film in a movie theater, the user may still be granted access to that secondary content when re-watching that same film in their own home or someone else's home. In the theater-use context, a user will only be able to view and/or listen to the secondary content on their personal user device. However, in the home-use context, the user may have the option to use the secondary content in place of certain aspects of the primary content. For example, if the secondary content comprises a foreign language audio track, the foreign language audio track may be used in place of the primary content's original audio track on the user's home theater system.

Figure 6:
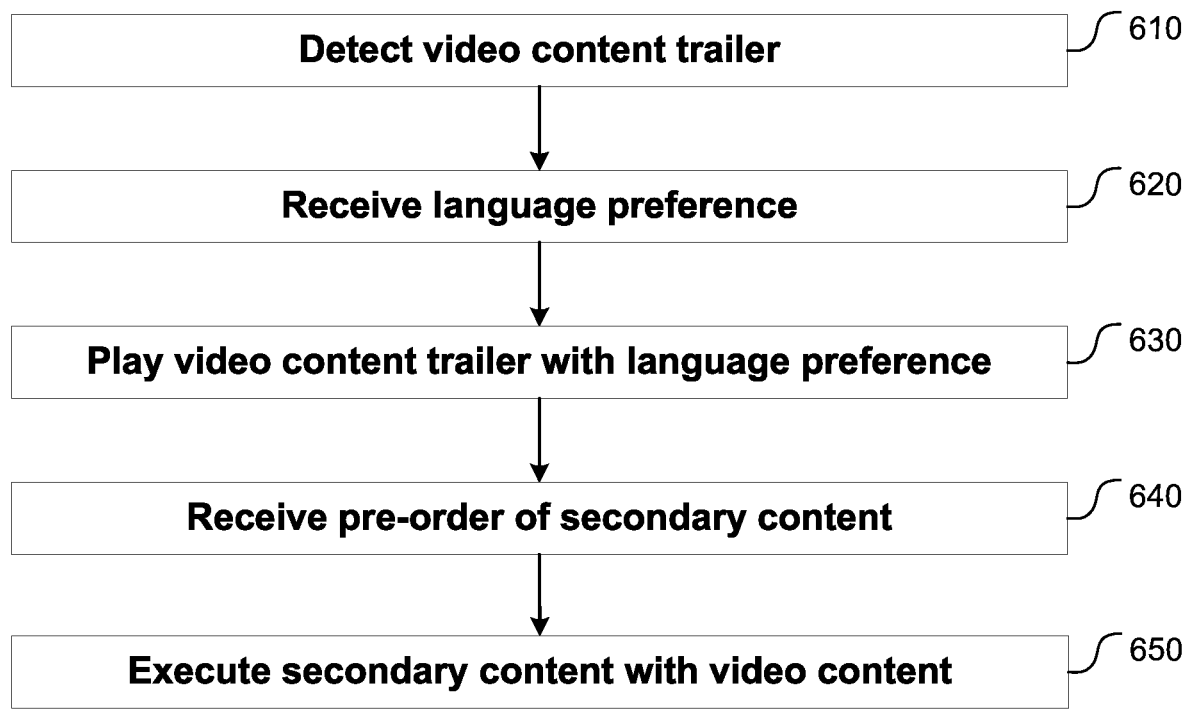
FIG. 6 illustrates an example secondary content pre-order process, in accordance with an embodiment of the present disclosure.
Figure 7:
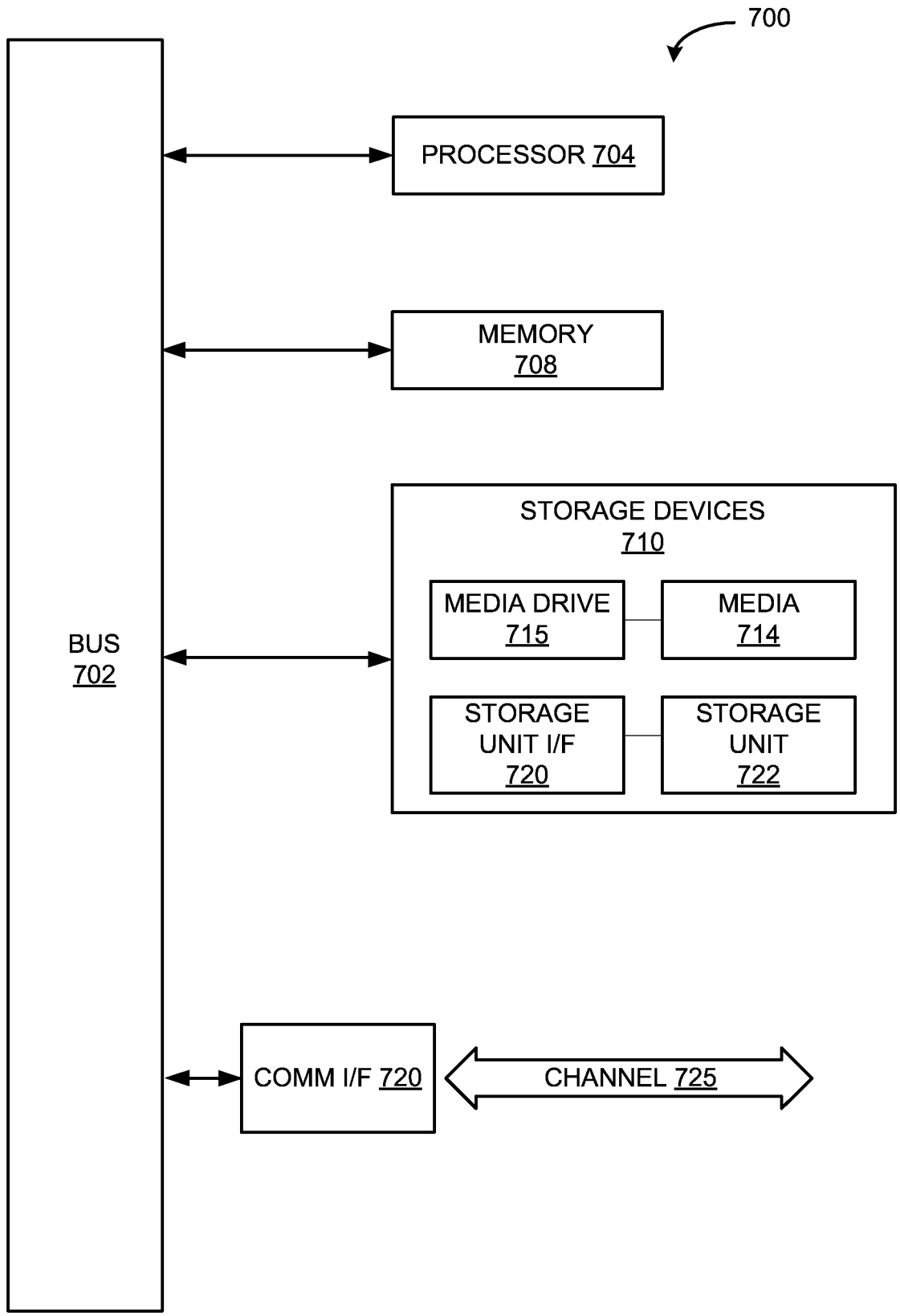
FIG. 7 illustrates an example computing module that may be used in implementing various features of embodiments of the present disclosure.

FIG. 6 provides an audio track pre-order method in accordance with an embodiment of the present disclosure. At operation 610, a video content trailer (advertisement or movie preview) is detected, which corresponds to a primary video content. At operation 620, a language preference is received from a user, and at operation 630, the video content trailer is played in accordance with the received language preference. At operation 640, the user pre-orders secondary content for the primary video content (e.g., an audio track for the feature film). Then, at operation 650, the secondary content is delivered, which may be executed by the user while watching the primary video content.

Where components or modules of the disclosed systems are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the disclosure using other computing modules or architectures.

Referring now to FIG. 7, computing module 700 may represent, for example, computing or processing capabilities found within desktop, laptop and notebook computers; hand-held computing devices (smart phones, tablets, cell phones, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, random access memory (RAM) or other dynamic memory might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 714 and a storage unit interface 720. The media drive 714 might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to or accessed by media drive 714. As these examples illustrate, the storage media can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 720. Communications interface 720 might be used to allow software and data to be transferred between computing module 700 and external devices. Examples of communications interface 720 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 720 might typically be carried on signals, which can be electronic, electromagnetic (which includes optical) or other signals capable of being exchanged by a given communications interface 720. These signals might be provided to communications interface 720 via a channel 725. This channel 725 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, main memory 708, storage unit interface 720, storage media 714, and channel 725. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present disclosure as discussed herein.

While various embodiments of the present disclosed systems and methods have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed systems or methods, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A method comprising:
   identifying, using an application installed on a first user device communicatively coupled to a remote application server, a video content being presented to or scheduled to be presented by a second user device to a user associated with user account information, wherein the user account information comprises a language preference including a preferred foreign language of received audio tracks or subtitles, wherein the first user device is a mobile device;
   in response to identifying the video content being presented to or scheduled to be presented to the user associated with the user account information, the remote application server identifying according to the language preference a foreign language subtitle file or foreign language audio track that is related to the video content, in the preferred foreign language, and available for access from the remote application server, wherein the foreign language audio track is an alternate language audio track not provided in the video content;
   receiving at the remote application server a request from the application installed on the first user device to access the identified foreign language subtitle file or foreign language audio track related to the identified video content;
   determining at the remote application server, using at least the user account information, whether the first user device is entitled to receive the foreign language subtitle file or foreign language audio track; and
   if the first user device is entitled to receive the foreign language subtitle file or foreign language audio track, the remote application server providing the foreign language subtitle file or foreign language audio track to the first user device for the user device to play whenever the user watches the video content; and
   if the user is not entitled to receive the foreign language subtitle file or foreign language audio track, sending a graphical user interface to the first user device to allow the user to purchase a license to access the foreign language subtitle file or foreign language audio track;
   wherein the video content comprises a plurality of different broadcast versions of a movie in the same language, the plurality of different broadcast versions of the movie comprising a first broadcast version of the movie and a second broadcast version of the movie, the first broadcast version of the movie comprising a scene that is not present in the second broadcast version of the movie or a scene that plays faster or slower than a corresponding scene in the second broadcast version of the movie, and wherein the purchase permits the user device to access each of a plurality of different versions of a foreign language subtitle file or foreign language audio track corresponding to a respective one of each of the plurality of different broadcast versions of the movie in the same language.

2. The method of claim 1, further comprising:
   providing a menu on the first user device to request the foreign language subtitle file or foreign language audio track.

3. The method of claim 1, wherein providing the foreign language subtitle file or foreign language audio track to the first user device for the first user device to play whenever the user watches the video content comprises:
   synchronizing playback of the foreign language subtitle file or foreign language audio track with the video content.

4. The method of claim 1, further comprising:
   receiving, at the application server, the language preference from the first user device.

5. The method of claim 1, wherein the subtitle file comprises visual subtitles that can be displayed on the first user device when the user is watching the video content.

6. The method of claim 1, further comprising:
   identifying a user using the user account information;
   automatically retrieving the language preference after identifying the user.

7. The method of claim 1, wherein the purchase allows the user to access the foreign language subtitle file or foreign language audio track a finite number of times and/or for a finite period of time.

8. The method of claim 1, wherein the purchase allows the user to execute the foreign language subtitle file or foreign language audio track an unlimited number of times.

9. The method of claim 1, further comprising:
   identifying a particular version of the video content from the plurality of versions of the video content.

10. The method of claim 9, wherein the foreign language subtitle file or foreign language audio track is identified according to the particular version of the video content.

11. The method of claim 9, wherein execution of the foreign language subtitle file or foreign language audio track is modified according to the particular version of the video content.

12. A system comprising:
   a remote application server in communication with one or more user devices, the application server comprising a non-transitory computer readable medium comprising an instruction set configured to cause a computing device to perform:
      identifying, using an application installed on a first user device communicatively coupled to the remote application server, a video content being presented to or scheduled to be presented by a second user device to a user associated with user account information, wherein the user account information comprises a language preference including a preferred foreign language of received audio tracks or subtitles, wherein the first user device is a mobile device;

in response to identifying the video content being presented to or scheduled to be presented to the user associated with the user account information, the remote application server identifying according to the language preference a foreign language subtitle file or foreign language audio track that is related to the video content, in the preferred foreign language, and available for access from the remote application server, wherein the foreign language audio track is an alternate language audio track not provided in the video content;

receiving at the remote application server a request from the application installed on the first user device to access the identified foreign language subtitle file or foreign language audio track related to the identified video content;

determining at the remote application server, using at least the user account information, whether the second user device is entitled to receive the foreign language subtitle file or foreign language audio track; and if the second user device is entitled to receive the foreign language subtitle file or foreign language audio track, the remote application server providing the foreign language subtitle file or foreign language audio track to the second user device for the second user device to play whenever the user watches the video content; and if the user is not entitled to receive the foreign language subtitle file or foreign language audio track, sending a graphical user interface to the second user device to allow the user to purchase a license to access the foreign language subtitle file or foreign language audio track;

wherein the video content comprises a plurality of different broadcast versions of a movie in the same language, the plurality of different broadcast versions of the movie comprising a first broadcast version of the movie and a second broadcast version of the movie, the first broadcast version of the movie comprising a scene that is not present in the second broadcast version of the movie or a scene that plays faster or slower than a corresponding scene in the second broadcast version of the movie, and wherein the purchase permits the second user device to access each of a plurality of different versions of a foreign language subtitle file or foreign language audio track corresponding to a respective one of each of the plurality of different broadcast versions of the movie in the same language.

13. The method of claim 1, wherein if the second user device is not entitled to receive the foreign language subtitle file or foreign language audio track because the video content is not publicly released, the method further comprises:

receiving purchase information for the user to purchase a license to access the foreign language subtitle file or foreign language audio track;

storing pre-purchased foreign language subtitle file or foreign language audio track information on a user account server indicating that the user has pre-purchased the foreign language subtitle file or foreign language audio track; and providing the foreign language subtitle file or foreign language audio track to the second user device for the second user device to play with the video content once the video content has been publicly released.

14. The method of claim 13, wherein providing the foreign language subtitle file or foreign language audio track to the second user device comprises:

synchronizing playback of the foreign language subtitle file or foreign language audio track with the video content.

15. The method of claim 13, further comprising identifying the user using user-specific credentials, the pre-purchased foreign language subtitle file or foreign language audio track information being associated with the identified user.

16. The method of claim 15, further comprising providing an advertisement for the video content in accordance with the language preference.

17. A method, comprising:

receiving, at a mobile device, a language preference from a user associated with user account information, wherein the language preference is a preferred foreign language of received audio tracks or subtitles;

storing, using the mobile device, the received language preference as a user preference associated with the user account information;

after storing the received language preference, identifying, at the mobile device, a video content being presented by a second device to the user associated with the user account information;

in response to identifying at the mobile device the video content being presented by the second device to the user associated with the user account information, the mobile device identifying according to the stored language preference a foreign language subtitle file or foreign language audio track that is related to the video content, in the preferred foreign language, and available for access from a remote application server, wherein the foreign language audio track is an alternate language audio track not provided in the video content;

requesting from the remote application server, at the mobile device, access to the identified foreign language subtitle file or foreign language audio track related to the video content;

in response to the remote application server determining, using at least the user account information, that the requesting mobile device is entitled to receive the foreign language subtitle file or foreign language audio track, the mobile device receiving the foreign language subtitle file or foreign language audio track from the remote application server; and the mobile device synchronously playing back the received foreign language subtitle file or foreign language audio track with the video content being presented to the user by the second device, wherein the operations of receiving, storing, identifying the video content being presented, identifying the foreign language subtitle file or foreign language audio track, requesting, receiving, and synchronously playing back are performed using a user application installed on the mobile device.

18. The method of claim 1, wherein identifying the video content being presented to or scheduled to be presented to the user associated with the user account information comprises identifying a movie being presented to or scheduled to be presented to the user in a theater.

19. The method of claim 17, wherein identifying the video content being presented to the user associated with the user account information comprises identifying a movie being presented to the user in a movie theater, and wherein the mobile device synchronously plays back the received foreign language subtitle file or foreign language audio track with the movie presented to the user at the movie theater.

* * * * *